United States Patent
Rigby

[11] 3,857,544
[45] Dec. 31, 1974

[54] ELECTRICALLY OPERATED RELIEF VALVES

[75] Inventor: Ronald William Rigby, Dorridge, England

[73] Assignee: Lucas Aerospace Limited, Birmingham, England

[22] Filed: Dec. 15, 1972

[21] Appl. No.: 315,403

[30] Foreign Application Priority Data
Dec. 15, 1971 Great Britain .................. 58166/71

[52] U.S. Cl. ............................. 251/133, 236/92 C
[51] Int. Cl. ......................................... F16k 31/02
[58] Field of Search ................. 157/529; 236/92 C; 251/133; 55/100

[56] References Cited
UNITED STATES PATENTS

| | | | |
|---|---|---|---|
| 2,029,465 | 2/1936 | Cunningham | 251/133 X |
| 2,203,613 | 6/1940 | Cyr | 251/133 |
| 2,753,146 | 7/1956 | Wiegers | 251/28 |
| 3,439,808 | 4/1969 | Sommermeyer | 55/100 X |

Primary Examiner—Edward G. Favors
Attorney, Agent, or Firm—Holman & Stern

[57] ABSTRACT

An electrically-operated pressure relief valve has a closure member which can be urged open by pressure at the valve inlet. A cross-member is secured to the shaft of a torque motor for pivotal movement within the valve body. One end of said cross-member engages a stem of said closure member, and the cross-member is also engaged by a spring which rotates the shaft to urge the closure member shut. The torque motor is energizable to rotate the shaft against the spring to open the valve. The bias applied by the spring is variable and the distance between the shaft and the engagement of the cross-member with the valve stem is also variable.

8 Claims, 5 Drawing Figures

3,857,544

ELECTRICALLY OPERATED RELIEF VALVES

This invention relates to pressure relief valves responsive to electrical control signals, and has as an object to provide such a valve in a convenient form.

A pressure relief valve according to the invention comprises a housing having an inlet and an outlet, a closure member movable in response to a pressure in the inlet to open the valve, a torque motor having a shaft to which the closure member is operatively connected, the said shaft being rotatable by the torque motor in response to an electrical control signal to open the valve, biasing means urging the shaft to rotate in a direction to shut the valve and means for varying movement of the closure member in response to a given angular movement of the shaft.

The invention also comprehends a temperature-responsive electro-hydraulic actuator arrangement, including a relief valve as above defined, means responsive to a temperature at a location external of said actuator arrangement to generate said electrical control signal, a piston and cylinder unit and a pilot valve operable to provide a servo control pressure to said piston and cylinder unit, said pilot valve being responsive to the position of said piston and to the flow through said relief valve, whereby the position of said piston is, in use, dependent on said temperature.

An example of the invention will now be described with reference to the accompanying drawings in which.

Figure 1:
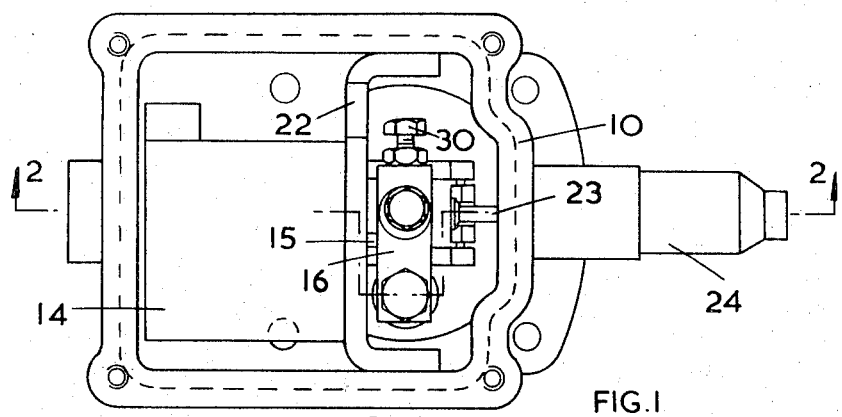
FIG. 1 is a view of a valve, with parts removed for clarity.
Figure 2:
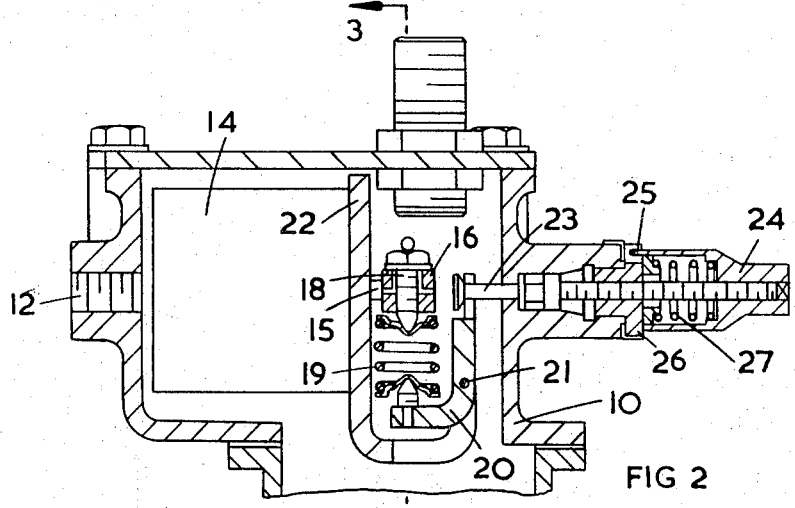
FIG. 2 is a scrap section on line 2—2 in FIG. 1.
Figure 3:
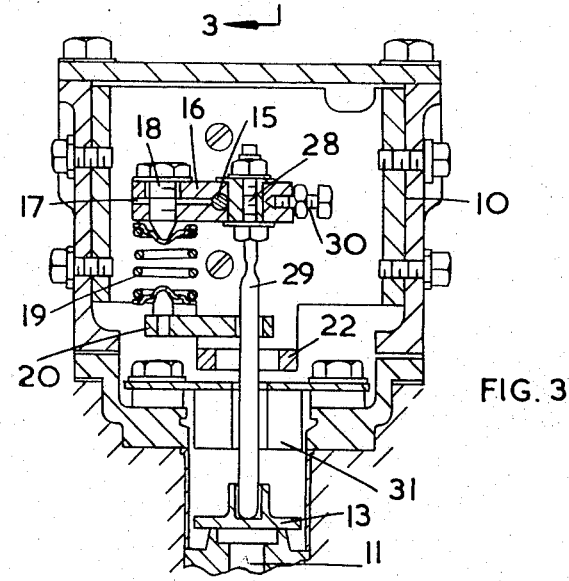
FIG. 3 is a section on line 3—3 in FIG. 2.

The valve shown in FIGS. 1 to 3 has a housing 10 provided with an inlet 11 and an outlet 12. A disc closure member 13 is associated with the inlet 11, whereby a pressure at the inlet 11 urges closure member 13 in a direction to open the valve.

Mounted within the housing 10 is a torque motor, shown generally at 14, having a shaft 15 which is rotatable in opposite directions in response to electrical signals obtained in a manner later to be described. The axis of shaft 15 is perpendicular to the axis of the closure member 13 and these axes do not intersect.

A block 16 has a hole through which shaft 15 extends, and a slot 17. The opposite sides of slot 17 are urged together by a screw 18 to clamp the block 16 on the shaft 15. Screw 18 also forms an abutment for compression spring 19, the other end of which is supported by a cranked plate 20 pivoted about a pin 21 carried by a bracket 22 forming part of the housing 10. Bracket 22 also supports the motor 14.

The end of plate 20 remote from the spring 19 is forked and is engaged by a flanged stem 23 which acts to limit movement of plate 20 in response to spring 19. Stem 23 threadedly engages a nut 24 which includes an axially extending projection 25 which can locate in a recess in a threaded bush 26 secured to the housing 10. The axial position of the stem 23 relative to the housing 10 may thus be adjusted by means of the square free end of stem 23. A spring 27 biasses nut 24 away from bush 26, providing a "stiffnut" action to maintain a required setting of stem 23.

A bush 28 is rotatable within the block 16 about an axis perpendicular to the axis of shaft 15, the axis of rotation of bush 28 being substantially aligned with the axis of closure member 13. A stem 29 is secured to the bush 28, the axis of stem 29 being eccentric with respect to the axis of rotation of the bush 28. Stem 29 engages closure member 13 there being sufficient play between stem 29 and closure member 13 to accommodate movement of stem 29 due to rotation of bush 28. Block 16, bush 28 and stem 29 thus provide a linkage operatively connecting the shaft 15 and closure member 13.

In use, therefore, spring 19 biases closure member 13 in a direction to shut the valve, bias applied by the spring 19 being variable by nut 24. Movement of closure member 13 in response to a given rotation of shaft 15 is variable by rotation of bush 28, bush 28 being locked in a desired angular position by a screw 30. Fluid flowing, in use, from inlet 11 to outlet 12 passes round the torque motor 14. The valve has an annular permanent magnet 31 within the housing 10 immediately downstream of the inlet 11, to trap any magnetic particles which may be present in the fluid and which would otherwise be attracted into the motor 14.

Figure 4:
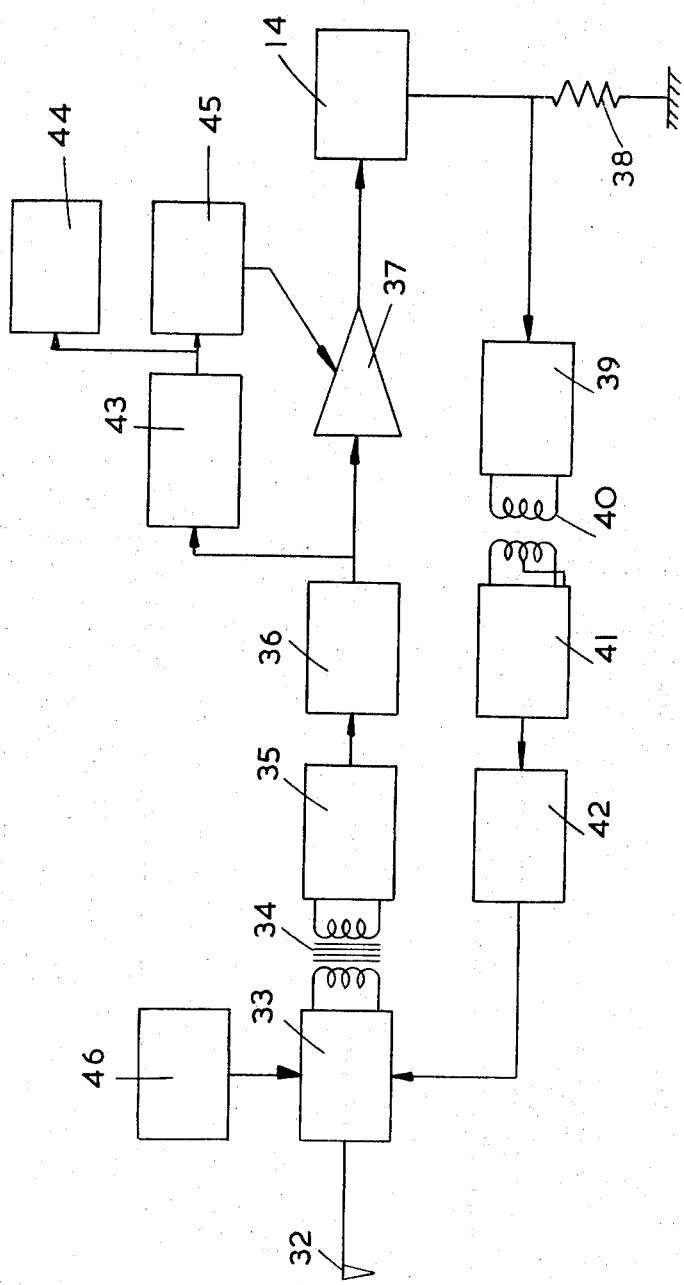
FIG. 4 shows diagrammatically an electrical control arrangement for the valve.
Figure 5:
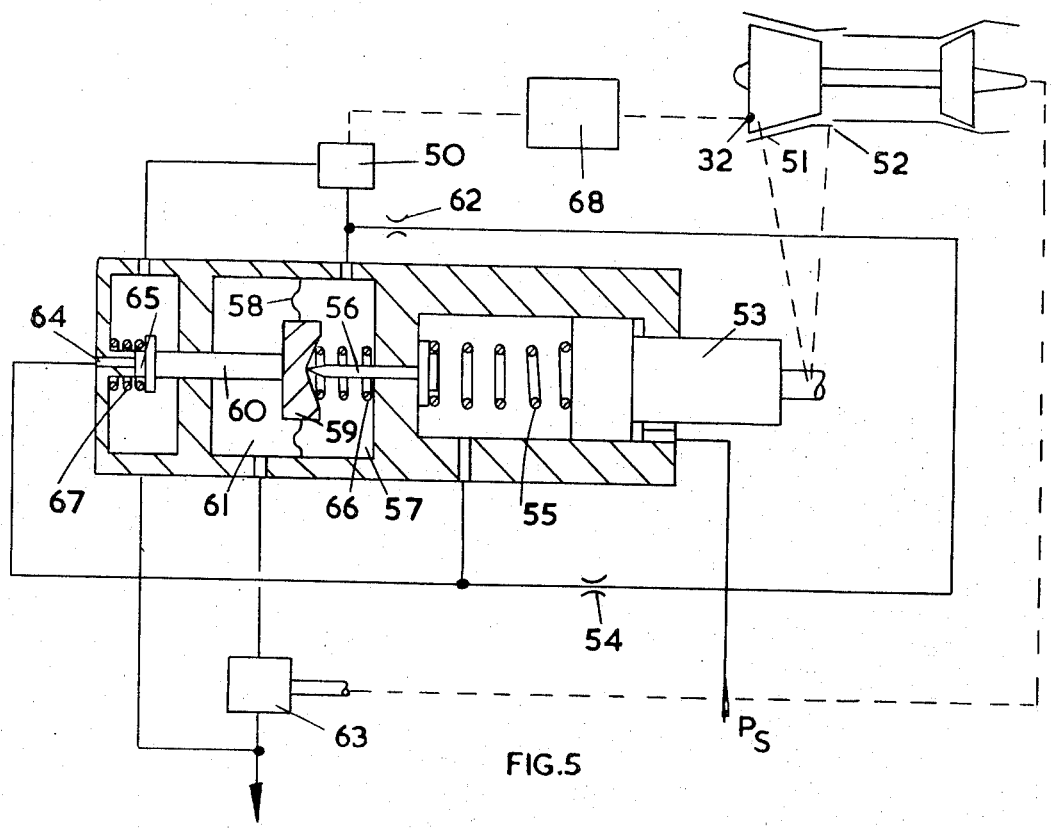
FIG. 5 shows diagrammatically a servo control system incorporating a valve according to the invention.

FIG. 4 shows a block diagram of an arrangement used to provide an electrical control signal for the torque motor 14. A plurality of thermocouple hot junctions 32 are located at the compressor inlet of a gas turbine engine (FIG. 5). The output of the junctions 32 is supplied to a circuit 33 which includes a cold-junction compensation circuit, providing a voltage proportional to the ambient temperature, whereby the sum of the hot junction and cold junction voltages is a signal proportional to the absolute inlet temperature $T_1$. Also applied to circuit 33 from a generator 46 is a reference signal proportional to a temperature of 288°K. The aforesaid $T_1$ signal is subtracted from the reference signal within circuit 33 and the resulting difference signal is "chopped" to provide a square wave.

The resulting square wave is supplied via a transformer 34 to an a.c., amplifier 35. The resultant amplified signal is supplied to a demodulator circuit 36 to provide a d.c. error signal, which is then fed via an amplifier 37 to the torque motor 14.

The current in torque motor 14 is measured as a voltage drop across resistor 38. The voltage dropped is "chopped" by modulator circuit 39 for supply via transformer 40 to a demodulator circuit 41. The transformers 34, 40 serve to isolate the thermocouple hot junctions 32 from the amplifier circuits. The feedback signal from the demodulator circuit 41, is supplied to a combined non-linear function generator and limiter unit 42. The non-linear function generator corrects the non-linearity of the output of the thermocouples with respect to temperature $T_1$. The limiter sets the maximum output current supplied to the torque motor 14.

The output of circuit 42 is supplied to circuit 33 for addition to the aforesaid $T_1$ signal. There is thus a closed loop between circuit 33 and torque motor 14. The output of demodulator 36 is supplied to a detector circuit 43, which has an output signal when the amplitude of demodulator 36 exceeds a predetermined level, due, for example, to failure of the limiter of unit 42. The output signal from circuit 43 energises a warning device 44 and, via a control circuit 45, reduces the supply to torque motor 14.

The relief valve is shown generally at 50 in FIG. 5, in which it forms part of a hydraulic servo controlled actuated arrangement for the inlet guide vanes 51 and bleed valves 52 of a gas turbine engine. The arrangement has a piston 53 coupled to the vanes 51 and valve 52 and subjected on opposite sides to a supply pressure Ps, which is conveniently the high pressure fuel supply to the engine, and to a pressure downstream of a restrictor 54 connected across the piston 53.

Piston 53 is biased against pressure Ps by a spring 55 which also engages a plunger 56 axially aligned with piston 53 and sealingly extending into a chamber 57. Chamber 57 is in part defined by a diaphragm 58 having a central boss 59 sealingly secured thereto. A stem 60 extends from the boss 59 in axial alignment with plunger 56. Diaphragm 58 also defines a further chamber 61.

Chamber 57 communicates with pressure Ps via a restrictor 62 and also with the inlet 11 of valve 50. Chamber 61 communicates with a low pressure drain via a valve 63 responsive to an increase in engine shaft speed to shut off chamber 61 from the drain.

A valve 64 has its inlet communicating with the downstream side of restrictor 54 and has a closure member 65 formed by the end of stem 60. The outlet of valve 64 is connected to the low pressure drain, as is the outlet of valve 50. Closure member 65, is biased in a direction to shut valve 64 by a spring 66 within chamber 57. A spring 67 opposes spring 66. A control arrangement 68, as shown in FIG. 4, is connected between thermocouples 32 and valve 50.

In use, an increase in temperature $T_1$ causes motor 14 to move closure member 13 in a direction to shut valve 50. The pressure in chamber 57 rises and stem 60 is moved to the left, as seen in FIG. 5, shutting valve 64. The pressure downstream of restrictor 54 rises towards Ps and, as a result of the difference in effective areas of the sides of piston 53, the latter moves to the right to urge vanes 51 towards a minimum air-flow position and to open the bleed valves 52. As piston 53 moves to the right the compression of spring 55 is reduced, allowing stem 60 to move so as slightly to open valve 64. The pressure downstream of restrictor 54 thus falls until piston 53 comes to a rest in an equilibrium position. Valve 64 thus acts as a pilot valve and provides, in association with restrictor 54, a fluid potentiometer. Valve 64 and piston 53 provide a follow-up servo arrangement responsive to temperature $T_1$. Piston 53 is similarly responsive to a decrease in engine speed to move vanes 51 to a minimum airflow position and to open bleed valves 52. In a like manner to drop in $T_1$ and/or an increase in engine speed moves piston 53 to the left to a new equilibrium position.

Failure of thermocouples 32 has the effect that the 288°K reference signal alone is applied to circuit 33 within control arrangement 68. The vanes 51 and valves 52; are then moved to a position corresponding to 288°K.

I claim:

1. A pressure relief valve comprising a housing having an inlet and an outlet, a closure member movable in response to a pressure in said inlet to open the valve, a torque motor, a linkage operatively connecting a shaft of said torque motor to said closure member, said shaft being rotatable in a direction to open the valve in response to an electrical control signal, biasing means urging the shaft to rotate in a direction to shut the valve and means for adjustably varying movement of the closure member in response to a given angular movement of the shaft, said linkage including a part secured to said shaft for rotation therewith and a stem extending transversely of the axis of said shaft and engaging said part and said closure member, the axis of said stem being spaced from the axis of said shaft.

2. A valve as claimed in claim 1 which includes a linkage operatively connecting said shaft and said closure member.

3. A valve as claimed in claim 1 in which said part includes means for varying the spacing of the axes of said shaft and said closure member.

4. A valve as claimed in claim 3 in which said means for varying said spacing comprises an element rotatable about an axis transverse to the axis of said shaft, said element having means therein for locating one end of said stem, and said locating means being spaced from the axis of rotation of said element.

5. A valve as claimed in claim 1 in which said biasing means comprises a spring engaged between said linkage part and an abutment carried on said housing.

6. A valve as claimed in claim 5 which includes means for varying the position of said abutment relative to said housing.

7. A valve as claimed in claim 1 in which said torque motor lies in a passage between said inlet and said outlet.

8. A valve as claimed in claim 7 which includes a permanent magnet in said passage adjacent said inlet.

* * * * *